(12) United States Patent
Bhogal et al.

(10) Patent No.: US 8,671,276 B2
(45) Date of Patent: Mar. 11, 2014

(54) METHOD FOR PASSING SELECTIVE ENCRYPTED ATTRIBUTES OF SPECIFIC VERSIONS OF OBJECTS IN A DISTRIBUTED SYSTEM

(75) Inventors: Kulvir Singh Bhogal, Fort Worth, TX (US); Johnston Jewell Clark, Roswell, GA (US); Jonathan G. Hall, Omaha, NE (US); Rick Allen Hamilton, II, Charlottesville, VA (US); John Dale Perkins, Manchester, MO (US); Alexandre Polozoff, Bloomington, IL (US); Gioacchino J. Pullara, Flushing, NY (US); Hadi S. Qadri, Morton Grove, IL (US); Ryan Patrick Zombo, Sterling Heights, MI (US); Peggy Catherine Zych, Seven Hills, OH (US)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 12/135,333

(22) Filed: Jun. 9, 2008

(65) Prior Publication Data
US 2008/0250242 A1 Oct. 9, 2008

Related U.S. Application Data

(63) Continuation of application No. 11/242,667, filed on Oct. 4, 2005.

(51) Int. Cl.
*H04L 9/00* (2006.01)
(52) U.S. Cl.
USPC ............................................. 713/167; 380/28
(58) Field of Classification Search
USPC .................. 713/153, 163, 183, 193, 340, 164; 714/38, 49, 48, 35, 37; 709/203, 217, 709/223, 237, 225, 229, 227; 726/22, 14, 726/13, 11, 34, 25, 26, 27; 380/42, 55, 58, 380/46; 382/225, 581
See application file for complete search history.

(56) References Cited

U.S. PATENT DOCUMENTS

| | | | |
|---|---|---|---|
| 5,898,781 A | 4/1999 | Shanton | |
| 6,594,763 B1 | 7/2003 | Madoukh | |
| 6,671,810 B1 | 12/2003 | Jardin | |
| 7,107,335 B1 | 9/2006 | Arcieri et al. | |
| 7,350,212 B2 * | 3/2008 | Lambert et al. | ............... 719/315 |

(Continued)

OTHER PUBLICATIONS

"Ingrian Networks Announces Solution for Securing Sensitive Data in Oracle Databases", Ingrian Networks, http://www.ingrian.com/news/pr040227.htm, pp. 1-2.

(Continued)

*Primary Examiner* — Jeffrey Pwu
*Assistant Examiner* — Nega Woldemariam
(74) *Attorney, Agent, or Firm* — Yee & Associates, P.C.; Arthur J. Samodovitz

(57) ABSTRACT

The present invention provides a computer implemented method, system, and computer program product for selective encryption of a data transmission. A data transmission is received. When the data transmission is received, the data transmission is unmarshaled. When the transmission is unmarshaled, objects and a set of sensitive fields within the data transmission are identified by referencing a metadata database. Only the set of sensitive fields within the data transmission are encrypted to form a partially encrypted data transmission. The partially encrypted data transmission is marshaled to form a marshaled data transmission. The marshaled data transmission is transmitted to a recipient.

20 Claims, 6 Drawing Sheets

(56) References Cited

U.S. PATENT DOCUMENTS

| | | | |
|---|---|---|---|
| 8,095,098 | B2 | 1/2012 | Brooks et al. |
| 2001/0011247 | A1 | 8/2001 | O'Flaherty et al. |
| 2002/0033844 | A1* | 3/2002 | Levy et al. ............ 345/744 |
| 2002/0124118 | A1 | 9/2002 | Colley et al. |
| 2003/0197733 | A1* | 10/2003 | Beauchamp et al. ...... 345/764 |
| 2004/0039908 | A1 | 2/2004 | Rose et al. |
| 2004/0181679 | A1 | 9/2004 | Dettinger et al. |
| 2004/0267595 | A1* | 12/2004 | Woodings et al. ........... 705/9 |
| 2005/0039034 | A1 | 2/2005 | Doyle et al. |
| 2005/0207569 | A1* | 9/2005 | Zhang et al. ............. 380/28 |
| 2007/0079117 | A1 | 4/2007 | Bhogal et al. |

OTHER PUBLICATIONS

"Setting Up Secure Sockets layer security for WebSphere Application Server for z/OS", http://publib.boulder.ibm.com/infocenter/ws60help/index.jsp?topic=ibm.websphere.zseries.doc/info/zseries/ae/tsec_settingupssl.html.

"Application Front Ends", 2nd Edition, The Foundation of Application Traffic Management, APM Advisors, Oct. 2004, www.apmadvisors.com/docs/AFE, pp. 1-60.

"CRYPTOCard Launches CRYPTO-Server 6.3 for LINUX at LINUXWORLD Canada, The first two-factor authentication slution designed specifically for Red Hat and SuSE", Toronto, Ontario, Apr. 2005, http://www.cryptocard.com/index.cfm?PID=396&DSP=PressRelease&PressID=206&pagename=News, pp. 1-4.

Droogenbroeck, "Partial encryption of images for real-time applications", Fourth IEEE Benelux Signal Processing, Hilvarenbeek, The Netherlands, pp. 11-15.

King, "security challenges for the future" http://www.iupui.edu/-ilights/symposium04/LIGHTPPT/king.pdf, retrieved Jul. 28, 2005, pp. 1-33.

Eskicioglu, "Protecting Intellectual Property in Digital Multimedia Networks", IEEE Computer Society, Jul. 2003, pp. 3945.

Boukhonnie, "Technology Briefing Cryptography: A Security Tool of the Information Age", http://www.uhisrc.com/FTB/Cryptography/FTBCryptography.pdf, retrieved Jul. 28, 2005, pp. 1-17.

Dino Esposito's WebLog, http://weblogs.asp.net/despos/archive/2004/11/09/254647.aspx, retrieved Jul. 28, 2005 pp. 1-5.

Encryption, http://www.dm-int.com_Encryption.html, retrieved Jul. 28, 2005, pp. 1-4.

"What is VPN Encruption?" http://findvpn.com/articles/encryption.php, retrieved Jul. 28, 2005, pp. 1-2.

"Network Encryption—history and patents" http://www.toad.com/gnu/netcrypt.html, pp. 1-10.

Schneier, "Schneier on Security", http://www.schneier.com/blog/archives/2005/05/massive_data_th.html.

Non-final office action dated Mar. 5, 2009 regarding U.S. Appl. No. 11/242,667, 13 pages.

\* cited by examiner

| | | |
|---|---|---|
| 302 | APPLICATION | TELNET, FTP, E-MAIL, ETC. |
| 304 | TRANSPORT | TCP, UDP |
| 306 | NETWORK | IP, ICMP, IGMP |
| 308 | LINK | DEVICE DRIVER AND NIC |

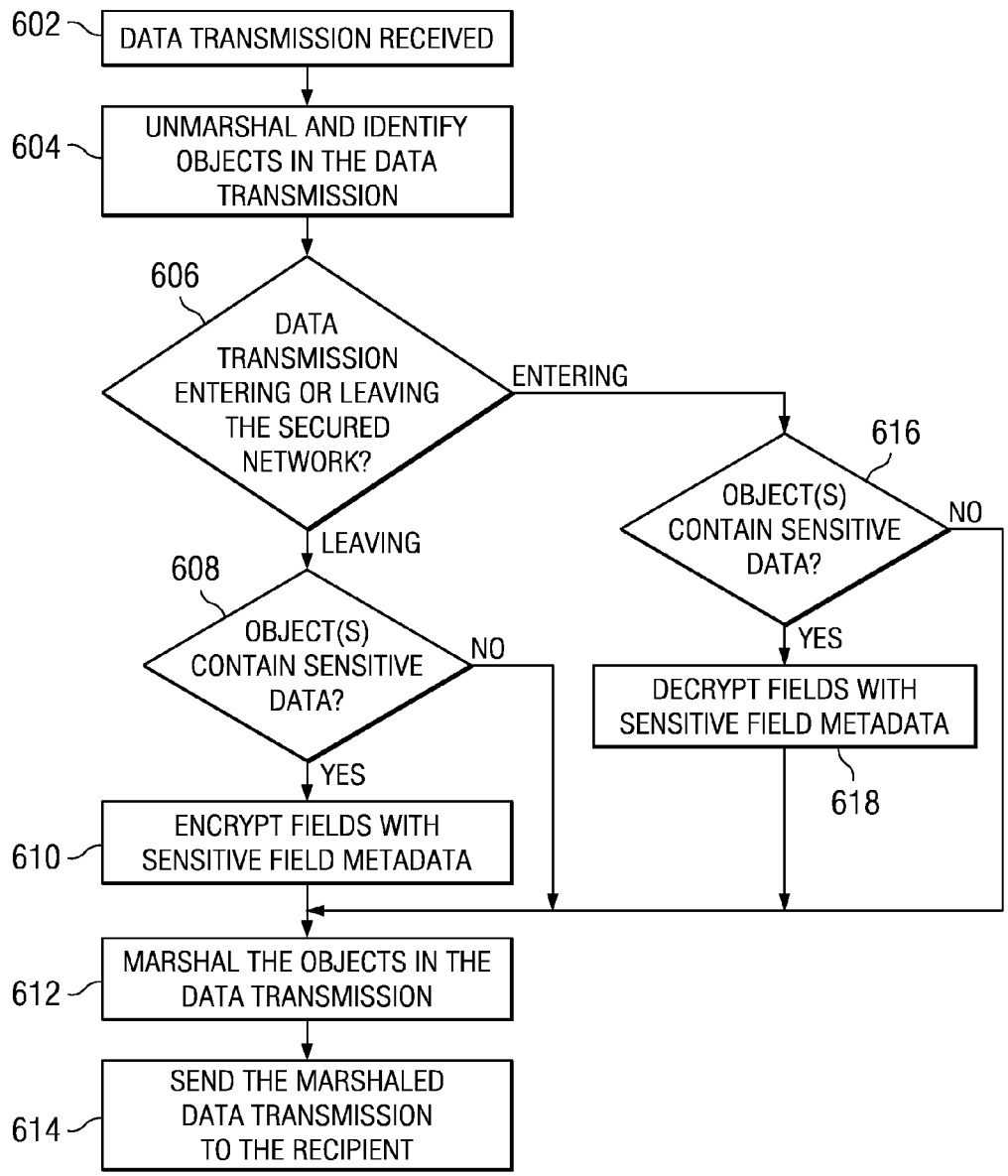

METHOD FOR PASSING SELECTIVE ENCRYPTED ATTRIBUTES OF SPECIFIC VERSIONS OF OBJECTS IN A DISTRIBUTED SYSTEM

This application is a continuation of application Ser. No. 11/242,667, filed Oct. 4, 2005, status pending.

BACKGROUND OF THE INVENTION

1. Field of the Invention

The present invention relates generally to the data processing field, and more particularly to a computer implemented method, system, and computer usable program code for selectively encrypting sensitive data in a distributed system.

2. Description of the Related Art

Data communication using distributed systems has grown exponentially in recent years because of enhanced communications standards and network availability. In distributed systems, messages are passed between a client and a server. As herein defined, a message or data transmission is any communication, transmission, file, program, object, attribute, field, or other data stream passed between servers interconnected by a network.

These messages contain data that may or may not be sensitive or confidential. If a message contains data that is sensitive, the message is protected prior to transport to ensure the security of the data as it flows across the network so that only the intended recipient can access the content of the message.

This security technique, commonly known as transport layer security, provides privacy and data integrity between two communicating applications. The protection occurs in a layer of software on top of the base transport protocol. In many cases, the security provided by a Secure Sockets Layer (SSL) communications link occurs through the use of encryption technology to ensure the integrity of the message in a network. The secure sockets layer provides confidentiality by ensuring the message content cannot be read. Because communications are encrypted between the sending and receiving parties, a third party cannot tamper with the message.

Encryption of data is a commonly applied method that is used for denying access to sensitive information to those who, generally, should not have access. The simple encryption of data being communicated between two points provides a single level of security. Encryption invoked using a transport layer security measure limits communication deciphering to those with access to the key. Anyone who has the key is privy to any communication at any location.

Data encryption at the transport level normally envelops total encryption of all of the data contained within the message. Through the secure sockets layer, the entire conversation is encrypted and transmitted between object request broker client and an object request broker server. The total encryption method necessitates the decryption of the entire conversation to intelligently interpret any of the data.

Total encryption is not always efficient because even if only a small portion of the data is sensitive, the entire message is necessarily encrypted and decrypted for the purpose of confidentiality. Additionally, most data theft occurs from within the organization that houses the data rather than from external interception and decryption. As a result, most encryption processing, efforts, and resources are not necessary or misplaced.

SUMMARY OF THE INVENTION

The present invention provides a computer implemented method, system, and computer program product for selective encryption of a data transmission. A data transmission is received. When the data transmission is received, the data transmission is unmarshaled. When the data transmission is unmarshaled, objects and a set of sensitive fields within the data transmission are identified by referencing a metadata database. Only the set of sensitive fields within the data transmission are encrypted to form a partially encrypted data transmission. The partially encrypted data transmission is re-marshaled to form a marshaled data transmission. The marshaled data transmission is transmitted to a recipient.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart illustrating the operation of a security engine for selective encryption in accordance with an illustrative embodiment of the present invention.

DETAILED DESCRIPTION OF THE PREFERRED EMBODIMENT

The different embodiments of the present invention provide a computer implemented method, system and computer usable program code that allows for more efficient encryption in distributed systems by selectively encrypting sensitive fields within a data transmission. Sensitive fields as herein defined are at least one field, attribute, class, or section of data that is intended to be accessible only by authorized parties. Because only sensitive fields are encrypted, less time and processing resources are required to encrypt and decrypt data transmissions for security purposes. Additionally, the present invention allows security of the data to be completely separated from the application that creates the data. In some data transmissions there will not be any sensitive fields making selective encryption and decryption unnecessary.

An illustrative embodiment of the present invention is applicable when used in a distributed network. A distributed network is a non-centralized network consisting of numerous computers that can communicate with one another and that appear to users as parts of a single, large centralized system of shared hardware, software, and data.

Because communication within a distributed network generally occurs over both secured private networks and unsecured public networks, there is a need to secure sensitive data when it is transferred over the unsecured network. Encryption is broadly defined as using an algorithmic process to transform data into a form in which there is a low probability of assigning meaning without use of an encryption key. The encryption key or keys are only available to authorized parties.

Figure 1:
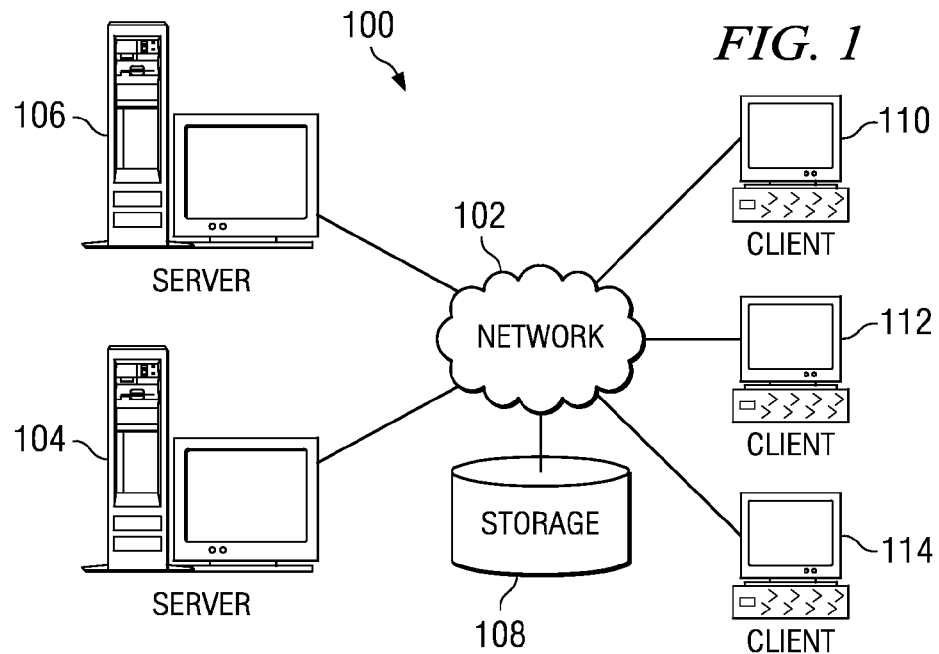
FIG. 1 is a pictorial representation of a network of data processing systems in which aspects of the present invention may be implemented.
Figure 2:
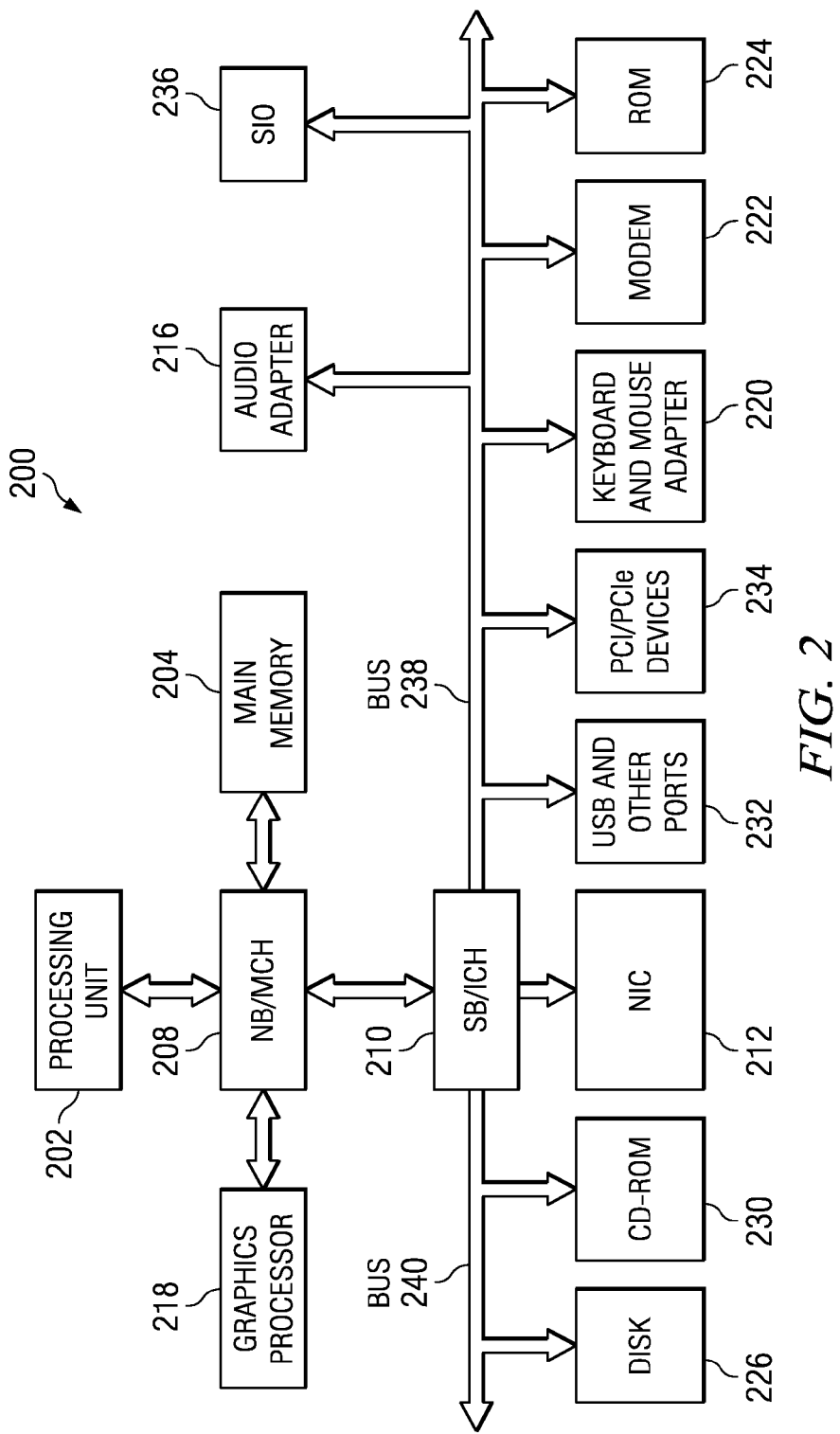
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. The distributed system or network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Servers 104 and 106 or clients 110, 112, and 114 may individually be interconnected to a private or secured network. Servers 104 and 106 and clients 110, 112, and 114 and the corresponding private network may communicate with the respective components of the distributed system by means of network 102, an unsecured public network.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 208 and south bridge and input/output (I/O) controller hub (ICH) 210. Processing unit 202, main memory 204, and graphics processor 218 are connected to north bridge and memory controller hub 202. Graphics processor 218 may be connected to north bridge and memory controller hub 208 through an accelerated graphics port (AGP).

In the depicted example, local area network (LAN) adapter 212 connects to south bridge and I/O controller hub 210. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 210 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 210.

An operating system runs on processing unit 202 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 202. Alternatively, a single processor system may be employed.

Instructions for the operating system, the object-oriented programming system, and applications or programs are located on storage devices, such as hard disk drive 226, and may be loaded into main memory 204 for execution by processing unit 202. The processes for embodiments of the present invention are performed by processing unit 202 using computer usable program code, which may be located in a memory such as, for example, main memory 204, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 204, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
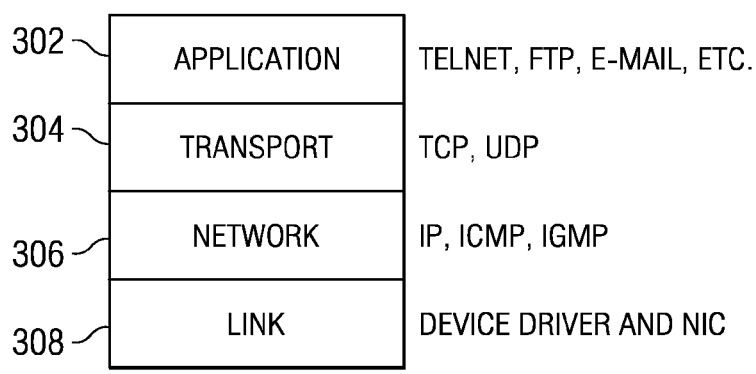
FIG. 3 is a diagram of a transmission control protocol/Internet protocol (TCP/IP) and similar protocols in accordance with an illustrative embodiment of the present invention.

FIG. 3 is a diagram of a transmission control protocol/Internet protocol (TCP/IP) and similar protocols in accordance with a preferred embodiment of the present invention. TCP/IP and similar protocols are utilized by communications architecture 300. In this example, communications architecture 300 is a 4-layer system. This architecture includes application layer 302, transport layer 304, network layer 306, and link layer 308. Each layer is responsible for handling various communications tasks. Link layer 308 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 306 also is referred to as the internet layer and handles the movement of packets of data around the network. For example, network layer 306 handles the routing of various packets of data that are transferred over the network. Network layer 306 in the TCP/IP suite is comprised of several protocols, including Internet protocol (IP), Internet control message protocol (ICMP), and Internet group management protocol (IGMP).

Next, transport layer 304 provides an interface between network layer 306 and application layer 302 that facilitates the transfer of data between two host computers. Transport layer 304 is concerned with things such as, for example, dividing the data passed to it from the application into appropriately sized chunks for the network layer below, acknowledging received packets, and setting timeouts to make certain the other end acknowledges packets that are sent. Many types of encryption occur at the transport level. For example, the security provided by the Secure Sockets Layer (SSL) communications link occurs at the transport level. Through SSL, an entire message is encrypted by the sending party, requiring the necessary decryption of the entire message by the receiving party in order to interpret any of the data.

The aspects of the present invention may be more specifically implemented in the transport layer by a third-party security engine. A security engine is a program, application, devise, system, database, script, instructions or other hardware or software that intercepts data transmissions as they pass between secured networks. The security engine oversees the encryption and decryption of sensitive data when that data is sent between different, servers, clients, applications, and users. In these examples, because the security engine is a third-party application, developers do not need to worry about interacting with or creating security objects. The sensitive data fields are identified by security engine administrators so that encryption of these attributes is handled outside of the code of the application sending or receiving data.

In many cases, the aspects of the present invention recognize it is inefficient to encrypt an entire data transmission when only a portion or portions of the data transmission contain sensitive information. It is also less secure to have employees who develop programs implement the security for the data transmissions in their programs. An illustrative embodiment of the present invention provides a method of using at least one security engine to unmarshal, inspect, selectively encrypt or decrypt, re-marshal, and send data to a final destination through a path that is at least partially unsecured. The data transmission may be between a requesting party and the object request broker client or a responding party and the object request broker client, with security engines acting as intermediaries to protect and decrypt sensitive data within the transmission before received by the final recipient. Embodiments of the present invention are particularly useful in sending a query to a database server over a network.

Data may be further protected by limiting access to the encryption key to applicants and individuals exchanging the selected data. Limited encryption and decryption access is important because data theft most often occurs within an organization by employees that should not be accessing the sensitive information, but nonetheless have access to the encryption key.

Illustrative embodiments of the present invention describe how sensitive data is recognized and how the security engines function in order to protect data as it flows in a distributed environment.

Figure 4A:
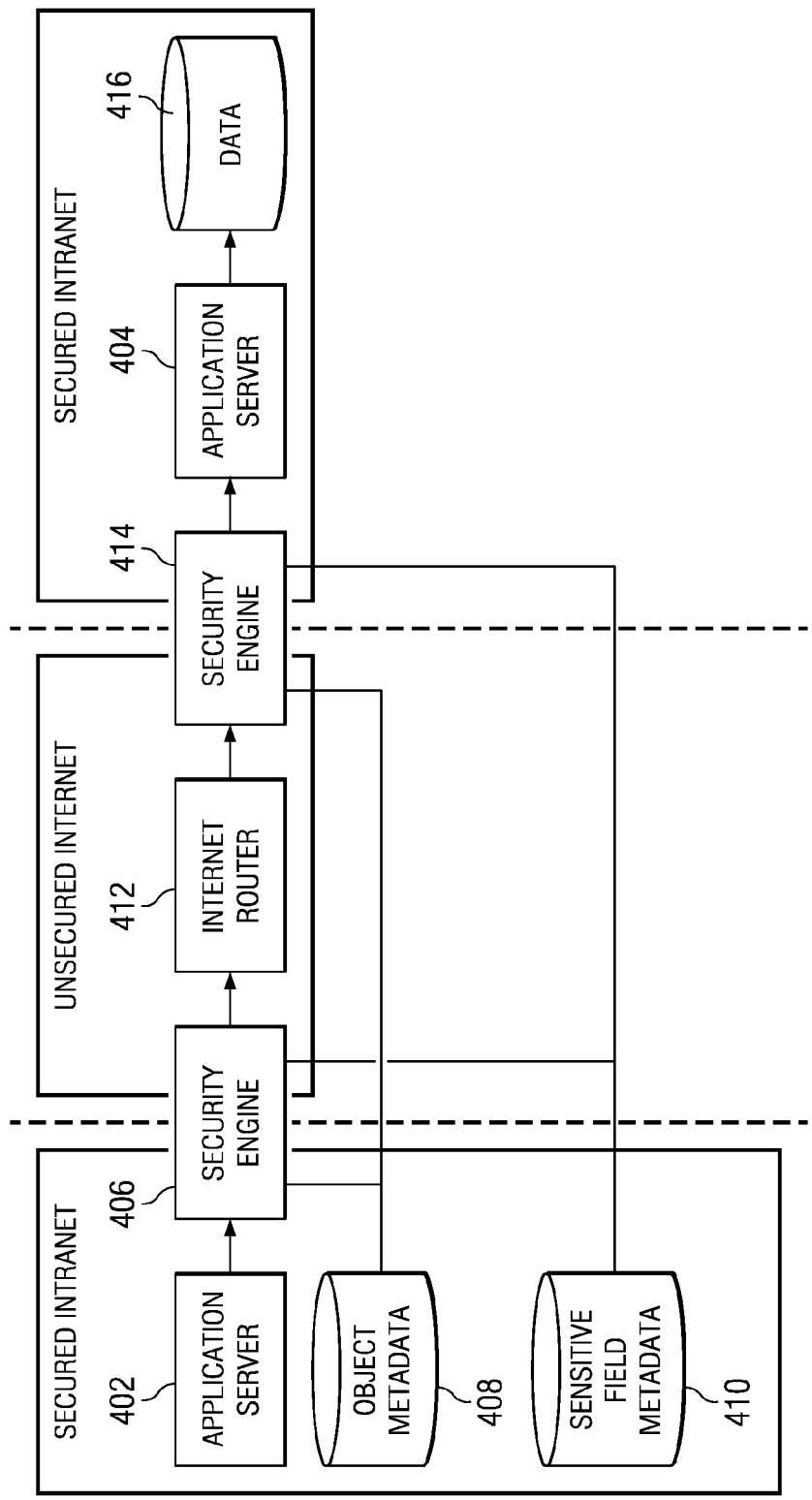
FIG. 4A is a block diagram illustrating selective encryption when a first server sends a request to a second server requiring encryption of a sensitive field.

FIG. 4A is a block diagram illustrating selective encryption when a first server sends a request to a second server requiring encryption of a sensitive field. As shown, application server 402 is the first server in these examples, and application server 404 is the second server in these examples. Both servers are both parts of secured intranets. However, in order to effectively communicate, these servers may need to pass information over an unsecured public Internet connection.

The servers may pass information using object request broker standards. As herein defined, an object request broker is a software mechanism that enables components of an application to transparently make and receive requests and responses by providing interoperability of different machines in distributed systems. Possible object request broker technologies include Remote Method Invocation (RMI), Common Object Request Broker Architecture (CORBA), Component Object Model (COM), and Distributed Component Object Model (DCOM). The object request broker takes a request from application server 402 and passes the request to application server 404 on the other end.

Marshaling is a well known term in the art referring to the process of packaging and sending interface parameters across thread, process, or machine boundaries. Application server 402 initiates a request that is marshaled. The request may be autonomous or as requested by a user. In the illustrative examples of the present invention, whenever a marshaled data transmission is sent to a remote location, such as application server 404, the data transmission is first passed through a selective encryption element hereinafter referred to as a security engine. The security engine unmarshals the data transmission, identifies what objects are contained within the data transmission, inspects the objects for sensitive fields, encrypts the sensitive fields, re-marshals the object(s) and partially encrypted data transmission, and sends the partially encrypted data transmission over the Internet.

Security engine 406 may use at least one database schema with different forms of metadata. Metadata provides information about the content, quality, description, form, definition, condition, and other characteristics of or about data.

A first schema may contain metadata about the object and is referred to as the object request broker object metadata database or object metadata 408. Object metadata 408 includes class metadata which may include a binary representation of the object, such as global unique identifier, version attributes, variables, methods, and functions among other data. Object metadata 408 is used to identify the object (s) within the relevant applications of the distributed network environment.

A second schema may be used to identify sensitive fields within the data transmission known as the sensitive field metadata database or sensitive field metadata 410. Sensitive field metadata 410 recognizes objects, object versions, fields and field names, encryption key, source and destination subnet, and effective start and end date among other potential data.

A security engine such as security engine 406 uses object metadata 408 and sensitive field metadata 410 to identify the elements of the data transmission and particularly the sensitive fields so that only sensitive data is encrypted. In another embodiment, each sensitive field may have a different encryption key. As herein defined, encryption key refers to one or more keys, elements, algorithms, or methods that may be used to encrypt and/or decrypt one or more sensitive fields. The non-sensitive portion of the data transmission is not encrypted but is re-marshaled together with the encrypted data by security engine 406 to form a partially encrypted data transmission. The re-marshaled data may be transmitted through Internet router 412 as the request is sent through the unsecured Internet.

Security engine 414 functions in the same way as security engine 406 except that instead of encrypting the sensitive fields, after unmarshaling and identifying the object, security engine 414 decrypts the partially encrypted data transmission and transmits the decrypted data transmission to application server 404 so that the request can be responded to. Application server 404 may access data 416 in order to obtain information initially requested by application server 402.

Security engine 406 and security engine 414 essentially act as gatekeepers protecting only sensitive data as it flows over an unsecured network between secured networks. In another embodiment of the present invention, the entire data transmission, in addition to sensitive fields, may be encrypted by security engine 406 or before it is sent to security engine 406 so that sensitive fields are double encrypted. This would make it especially difficult for an intercepted data transmission, and especially sensitive fields, to be decrypted.

Figure 4B:
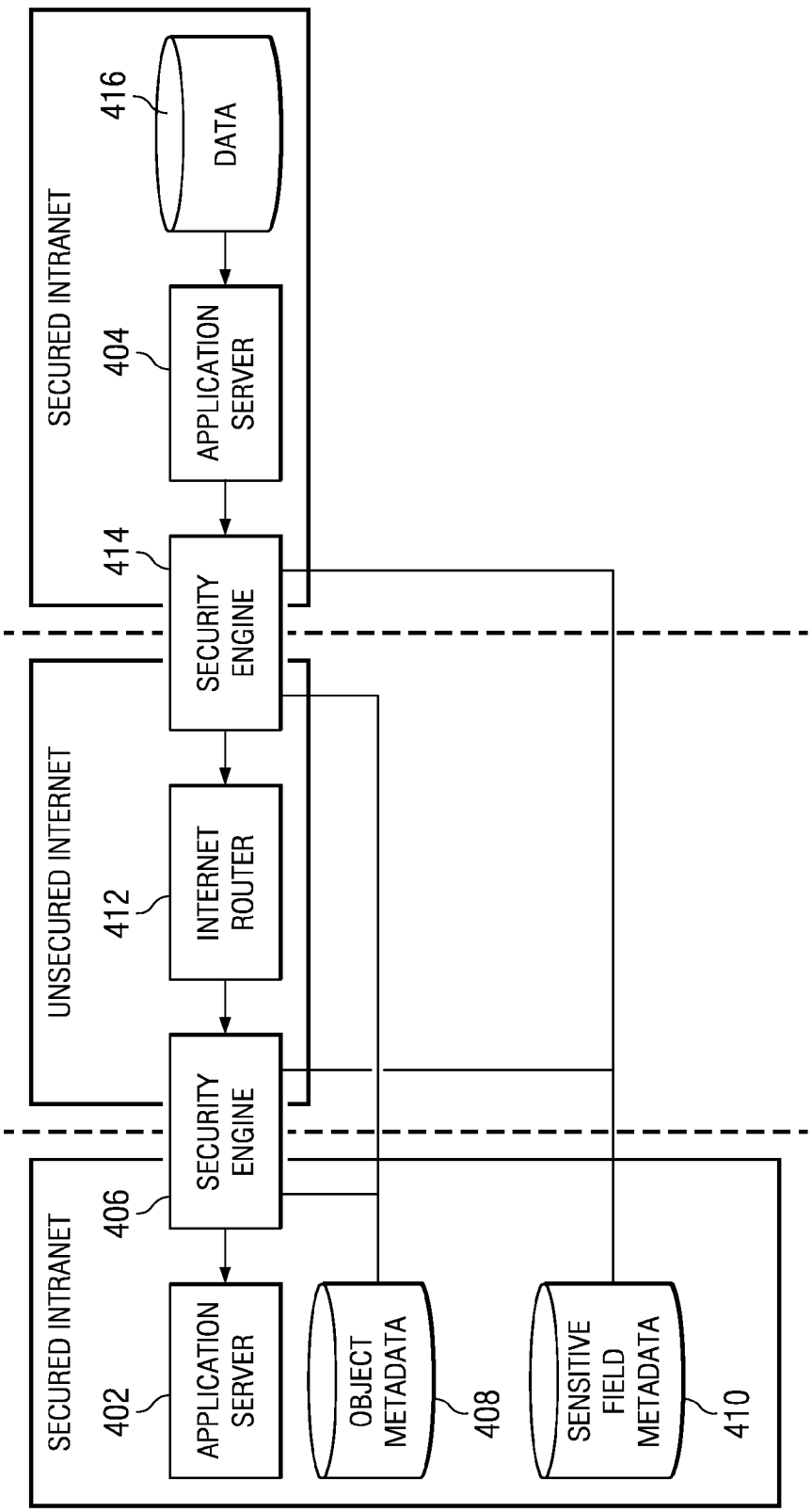
FIG. 4B is a block diagram illustrating selective object encryption of the return path when a second server responds to a request from a first server requiring encryption of a sensitive field.

FIG. 4B is a block diagram illustrating selective object encryption when a first server responds to a request from a second server requiring encryption of a sensitive field. Application server 404, the object request broker server, responds to the request from application server 402 by accessing the requested information in data 416.

As an illustrative example, if the initial request from application server 402 was for an employee profile, sensitive fields in the employee profile may include social security number and employee name. Other parts of the employee profile including salary, time with the company, and responsibilities may not be considered sensitive.

Application server 404 receives the requested employee profile from data 416. Application server 404 passes the profile to security engine 414 which unmarshals and identifies the data transmission as an employee profile and identifies specific fields that make up an employee profile using object metadata 408. Security engine 414 then compares the fields of the data transmission with sensitive field metadata 410 to determine if there are sensitive fields, including social security number and name. Security engine 414 encrypts only those fields before re-marshaling the data transmission and passing it to Internet router 412.

When the data transmission reaches security engine 406 from Internet router 412 the data transmission is unmarshaled and the object is identified as an employee profile using object metadata 408. The sensitive fields including social security number and employee name are identified and decrypted using sensitive field metadata 410. The data transmission in unencrypted form is then passed to application server 402 from security engine 406 as a response to the initial request.

Figure 5:
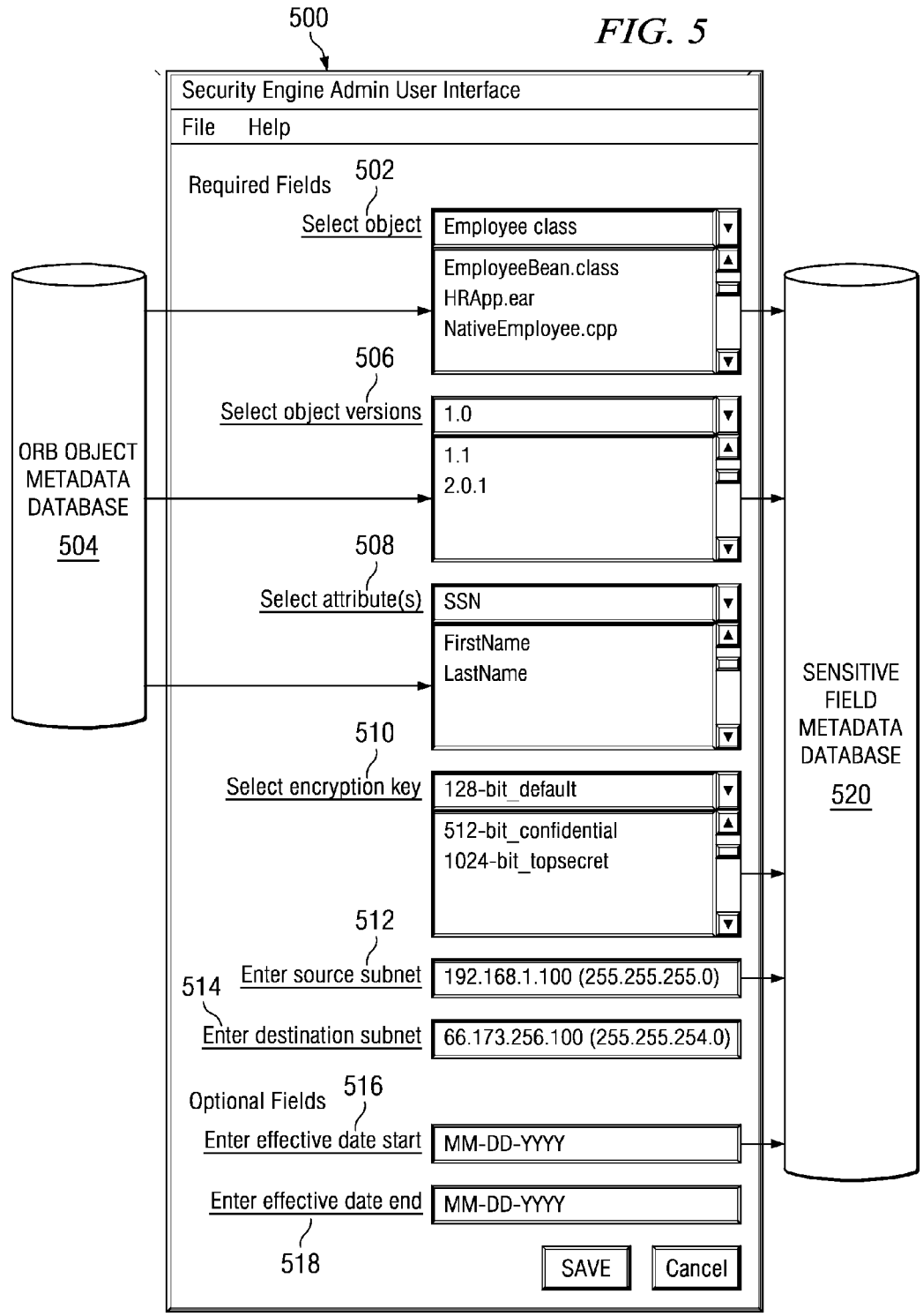
FIG. 5 depicts an example screen of display for managing selective encryption according to an object request broker object metadata database and a sensitive field metadata database in accordance with an illustrative embodiment of the present invention.

FIG. 5 depicts an example screen of display for managing selective encryption according to an object request broker object metadata database and a sensitive field metadata database in accordance with an illustrative embodiment of the present invention.

As a result of the increasing complexity of data processing systems and with the introduction of more complex software applications, attempts have been made to simplify the interface between a user and the large amounts of data present within a modern data processing system. One example of an attempt to simplify the interface between a user and a data processing system is the utilization of a so-called graphic user interface (GUI) to provide an intuitive and graphical interface between the user, such as the security engine administrator and the selective encryption data processing system.

A GUI is an interface system, including devices by which a user interacts with a system, system components, and/or system applications via windows or view ports, icons, menus, pointing devices, electronic pens, touch screens, and other input devices. The security engine may include, but is not limited to, a graphical user interface 500 that enables an administrator to select, synchronize, update, access, and save security settings for any object 502 in object request broker object metadata database 504.

For each object 502, an administrator can choose fields, including but no limited to, object version 506, attributes 508, encryption keys 510, source subnet 512, and destination subnet 514. The security engine also provides the option to select effective start date 516 and effective end date 518 for each version of object 502. Each of the specified fields is similarly synchronized with sensitive field metadata database 520 to ensure that information may be securely passed, received, and interpreted between sensitive field metadata database 520 and one or more security engines. Graphical user interface 500, as shown allows the administrator to easily access and update information for both object request broker object metadata database 504 and sensitive field metadata database 520.

Object request broker object metadata database 504 identifies object 502 and classes of object 502 allowing the administrator to specify attributes 508 that should be considered sensitive for sensitive field metadata database 520. The attributes 508 may vary depending on object version 506, and as a result, the administrator can specify object version 506 as well. For example, the administrator may choose to have employee names and social security numbers deemed sensitive so that they will be encrypted if transferred over a public network.

The administrator may choose between different encryption levels, algorithms, and encryption keys 510 depending on how sensitive attributes 508 are. For example, the administrator could specify 128, 512, or 1012 bit encryption as desired. Additionally, different encryption keys could be specified for the social security number and employee name. The administrator may also specify a source subnet 512 from which object 502 may be sent. Similarly, the administrator may specify destination subnet 514 where object 502 and respective attributes 508 may be received and viewed.

Effective start date 516 indicates when object 502 must be secured, whereas effective end date 518 indicates when object 502 no longer requires the security engine to secure transmission. Sensitive field metadata database 520 uses the various fields to identify, encrypt, and decrypt sensitive attributes 508 within a data request and response over an unsecured network.

Graphical user interface 500 and the security engine are dynamic elements that may have elements added, removed, or updated as often as is necessary to ensure secure data flow. In another embodiment, object request broker object metadata database 504 and sensitive field metadata database 520 could be a single database accessed by the security engine and graphical user interface 500.

FIG. 6 is a flowchart illustrating the operation of a security engine for selective encryption in accordance with an illustrative embodiment of the present invention. The process illustrated in FIG. 6 may be implemented between servers functioning as server and client, such as application server 402 and application server 404 by a security engine such as security engines 406 and 414 in FIG. 4.

Initially, the security engine receives a data transmission (step 602). The Security engine unmarshals and identifies objects in the data transmission (step 604). The security engine uses object request broker object metadata within the object request broker object metadata database to identify objects in the data transmission (step 604).

At that point, a determination is made as to whether the data transmission is entering or leaving the secured network (step 606). If security engine determines the data transmission is leaving the network in step 606, the security engine must then determine whether the objects contain sensitive data (step 608). If security engine compares the objects with the sensitive field metadata database and determines that the objects contain sensitive data (step 608), the security engine encrypts the fields with sensitive field metadata (step 610). The security engine marshals the object(s) in the request (step 612) which may include encrypted and non-encrypted fields. If the security engine determines that the objects do not have sensitive data (step 608), the security engine marshals the object(s) in the request (step 612). The security engine then sends the marshaled data transmission to the recipient (step 614).

Returning again to step 606, if the security engine determines that the data transmission is entering the secured network (step 606), the security engine determines whether the object(s) contain sensitive data (step 616). If the objects contain sensitive data (step 616), the security engine decrypts the fields with sensitive field metadata (step 618) using the sensitive field metadata database. The security engine then marshals the objects in the request (step 612).

If the security engine determines there is not sensitive data (step 616), the security engine automatically marshals the objects in the request (step 612). The security engine then sends the marshaled data transmission to the recipient. The recipient after a message has been encrypted is commonly a security engine. The recipient after the data transmission has been decrypted is commonly the object request broker client server or the object request broker server. In the process, the recipient accesses the same metadata databases that the sender used to encrypt the transmission to decrypt the transmission so it is readable at the intended destination.

The data transmission received by the security engine is likely to be requests for information or responses based on a previous request. The security engine uses the metadata databases to identify objects in the data transmission and encrypt or decrypt sensitive fields as needed. In the example of a transferred employee profile, only the sensitive fields are encrypted allowing the encryption and decryption processes to be more efficiently implemented. The data is policy based encryption system of the security engine allows for secured transmission while minimizing encryption and decryption times and resources. The metadata databases tell the security engine how to identify and encrypt only critical data to ensure efficiency.

The invention can take the form of an entirely hardware embodiment, an entirely software embodiment or an embodiment containing both hardware and software elements. In preferred embodiments, the invention is implemented in hardware or software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selective encryption of a data transmission, the computer implemented method comprising:
   responsive to receiving the data transmission, unmarshaling the data transmission;
   responsive to unmarshaling the data transmission, identifying objects and a set of sensitive fields within the data transmission by referencing a metadata database;
   encrypting only the set of sensitive fields contained in the data transmission to form a partially encrypted data transmission;
   re-marshaling the partially encrypted data transmission to form a marshaled data transmission; and
   transmitting the marshaled data transmission to a recipient.

2. The computer implemented method of claim 1, wherein the method is implemented in a security engine.

3. The computer implemented method of claim 2, wherein the selective encryption by the security engine is used for data transmission between an object request broker client and object request broker server.

4. The computer implemented method of claim 1, wherein the partially encrypted data transmission may not contain any encrypted portions if there are not sensitive fields in the data transmission.

5. The computer implemented method of claim 1, wherein the transmitting step comprises:
   transmitting the marshaled data transmission across an unsecured network to a security engine for subsequent receipt by the recipient.

6. The computer implemented method of claim 1, comprising encrypting the marshaled data transmission so that portions of the data transmission are encrypted twice.

7. The computer implemented method of claim 2 comprising:
   allowing a user to customize security settings for the security engine.

8. The computer implemented method of claim 7, wherein the allowing step comprises:
   establishing security settings for at least one of an object type, object version, object attribute, encryption key, source subnet, destination subnet, effective date start, and effective date end.

9. The computer implemented method of claim 8, wherein the establishing step is performed using a graphical user interface.

10. The computer implemented method of claim 7, wherein the allowing step further comprises:
    accessing, updating, and synchronizing the metadata database with the security engine for standardizing security settings.

11. The computer implemented method of claim 10, wherein the metadata database is an object request broker object metadata database for identifying the objects within the data transmission.

12. The computer implemented method of claim 10, wherein the metadata database is a sensitive field metadata database for identifying the set of sensitive fields contained in the request.

13. The computer implemented method of claim 1, further comprising:
    responsive to receiving the marshaled data transmission, unmarshaling the marshaled data transmission to form the partially encrypted data transmission;
    responsive to unmarshaling the marshaled data transmission, identifying the objects and the set of sensitive fields within the partially encrypted data transmission by referencing the metadata database;
    decrypting only the set of sensitive fields contained in the partially encrypted data transmission to form the data transmission;
    re-marshaling the data transmission; and
    transmitting the data transmission to the recipient.

14. The computer implemented method of claim 12, wherein the recipient is at least one of an object request broker client server, or an object request broker server.

15. A Tangible computer storage device having a computer program encoded thereon for selective encryption of a data transmission, said computer program product comprising: computer usable program code, responsive to receiving the data transmission, for unmarshaling the data transmission; computer usable program code, responsive to unmarshaling the data transmission, for identifying objects and a set of sensitive fields within the data transmission by referencing a metadata database; computer usable program code for encrypting only the set of sensitive fields contained in the data transmission to form a partially encrypted data transmission; computer usable program code for marshaling the partially encrypted data transmission to form a marshaled data transmission; and computer usable program code for transmitting the marshaled data transmission to a recipient.

16. The tangible computer storage device of claim 15, wherein the metadata database is an object request broker object metadata database for identifying the objects and a sensitive field metadata database for identifying the set of sensitive fields.

17. The tangible computer storage device of claim 16, wherein the computer program product further comprises: computer usable program code for synchronizing security settings of the security engine with the metadata database.

18. The tangible computer storage device of claim 15, wherein the computer program product further comprises: computer usable program code for customizing security settings to govern the transmission of data.

19. The tangible computer storage device of claim 15, wherein the computer program product further comprises: computer usable program code, responsive to receiving the marshaled data transmission, for unmarshaling the marshaled data transmission; computer usable program code, responsive to unmarshaling the data transmission, for identifying the objects and the set of sensitive fields within the partially encrypted data transmission by referencing the metadata database; computer usable program code for decrypting only the set of sensitive fields contained in the partially encrypted data transmission to form the data transmission; computer usable program code for marshaling the data transmission; and computer usable program code for transmitting the data transmission to the recipient.

20. An apparatus comprising:
    a processor for running a security engine, wherein the security engine receives a data transmission, unmarshals the data transmission, identifies objects and sensitive fields within the data transmission by referencing a metadata database, encrypts only the sensitive fields contained in the data transmission using an encryption key to form a partially encrypted data transmission, marshals the partially encrypted data transmission to form a marshaled data transmission, and transmits the marshaled data transmission to a recipient;

a storage device operably connected to the processor for storing the security engine wherein the security engine may be loaded into a main memory for execution by the processor; and a network interface card operably connected to the processor and the storage, wherein the network interface card is enabled for data transmissions across a network and accesses the metadata database through the network.

* * * * *